(12) United States Patent
Shingu

(10) Patent No.: US 11,456,984 B2
(45) Date of Patent: Sep. 27, 2022

(54) INFORMATION PROCESSING APPARATUS, INFORMATION PROCESSING SYSTEM, AND NON-TRANSITORY COMPUTER READABLE MEDIUM

(71) Applicant: FUJIFILM BUSINESS INNOVATION CORP., Tokyo (JP)

(72) Inventor: Jun Shingu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 564 days.

(21) Appl. No.: 16/034,472

(22) Filed: Jul. 13, 2018

(65) Prior Publication Data
US 2019/0036861 A1    Jan. 31, 2019

(30) Foreign Application Priority Data

Jul. 27, 2017    (JP) .............................. JP2017-145925

(51) Int. Cl.
*H04L 51/18*    (2022.01)
*H04L 51/04*    (2022.01)

(52) U.S. Cl.
CPC .............. *H04L 51/18* (2013.01); *H04L 51/04* (2013.01)

(58) Field of Classification Search
CPC .................................. H04L 51/18; H04L 51/04
See application file for complete search history.

(56) References Cited

U.S. PATENT DOCUMENTS

| | | | | |
|---|---|---|---|---|
| 10,505,875 | B1 * | 12/2019 | Jenks ..................... | G06F 40/279 |
| 2008/0028027 | A1 * | 1/2008 | Jachner ................... | H04L 51/04 |
| | | | | 709/206 |
| 2014/0047358 | A1 * | 2/2014 | Park ........................ | H04L 51/04 |
| | | | | 715/758 |
| 2015/0244656 | A1 * | 8/2015 | Choi ..................... | H04L 12/1818 |
| | | | | 709/206 |
| 2015/0281143 | A1 * | 10/2015 | Wang ...................... | H04L 51/04 |
| | | | | 709/206 |

(Continued)

FOREIGN PATENT DOCUMENTS

| | | |
|---|---|---|
| JP | 2014-086015 A | 5/2014 |
| JP | 2014-134859 A | 7/2014 |

OTHER PUBLICATIONS

Sep. 28, 2021 Office Action issued in Japanese Patent Application No. 2017-145925.

*Primary Examiner* — Soe Hlaing
(74) *Attorney, Agent, or Firm* — Oliff PLC

(57) ABSTRACT

An information processing apparatus includes a display that displays messages received from other information processing apparatuses, and transmission messages from the information processing apparatus, in a display region in a time sequence, a receiving unit that receives a transmission message responsive to a received message displayed on the display, and a transmission instruction of the transmission message, and a controller that, if a second received message different from a first received message as a message received from a link destination to which the transmission message is directed is displayed in the display region before the receiving unit receives the transmission instruction of the transmission message, controls the display such that the transmission message indicating an association with the first received message is displayed on the display region.

15 Claims, 17 Drawing Sheets

(56) References Cited

U.S. PATENT DOCUMENTS

2015/0350122 A1\* 12/2015 Roch ................... H04L 51/04
  709/204
2017/0090720 A1\* 3/2017 Chen ................ G06F 3/04817

\* cited by examiner

FIG. 3

| MESSAGE ID | MESSAGE CONTENT | SENDER ID | START TIME OF DRAFTING | STORAGE TIME OF DRAFT | TRANSMISSION TIME | LINK INFORMATION |
|---|---|---|---|---|---|---|
| MESSAGE 1 | ... | A | 2017/6/3 13:11:00 | 2017/6/3 13:12:00 | 2017/6/3 13:12:05 | - |
| MESSAGE 2 | ... | B | 2017/6/3 13:10:27 | 2017/6/3 13:13:18 | 2017/6/3 13:13:22 | MESSAGE 1 |
| MESSAGE 3 | ... | C | 2017/6/3 13:23:01 | 2017/6/3 13:28:59 | 2017/6/3 13:29:37 | MESSAGE 2 |
| MESSAGE 4 | ... | A | 2017/6/3 13:20:59 | 2017/6/3 13:30:01 | - | MESSAGE 1 |

INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-145925 filed Jul. 27, 2017.

BACKGROUND

(i) Technical Field

The present invention relates to an information processing apparatus, an information processing system, and a non-transitory computer readable medium.

(ii) Related Art

As communication networks including the Internet are in widespread use, an information exchanging method called "chat" is more and more used. In a chat, sentences (hereinafter referred to as a "message") are exchanged between multiple information processing apparatuses, using characters.

In a chat, messages received and transmitted in time sequence may be displayed. Since there is no restriction applied on a transmission timing of a message in each information processing apparatus, another message not related to a particular received message may be received before a message responsive to the particular received message is transmitted.

If the response message is transmitted in such a case, the transmitted message is displayed immediately subsequent to another message different from the particular message rather than subsequent to the particular message which the reply message is transmitted in response to. The transmitted reply message may be recognized as a reply message to the other message, and people may have difficulty in recognizing the flow of the conversation from the series of time-elapsed messages.

SUMMARY

According to an aspect of the invention, there is provided an information processing apparatus. The information processing apparatus includes a display that displays messages received from other information processing apparatuses, and transmission messages from the information processing apparatus, in a display region in a time sequence, a receiving unit that receives a transmission message responsive to a received message displayed on the display, and a transmission instruction of the transmission message, and a controller that, if a second received message different from a first received message as a message received from a link destination to which the transmission message is directed is displayed in the display region before the receiving unit receives the transmission instruction of the transmission message, controls the display such that the transmission message indicating an association with the first received message is displayed on the display region.

BRIEF DESCRIPTION OF THE DRAWINGS

Exemplary embodiments of the present invention will be described in detail based on the following figures, wherein:

FIG. 3 illustrates an example of a message management table;

DETAILED DESCRIPTION

Exemplary embodiments are described below with reference to the drawings. Identical elements and operations are designated with the same symbols throughout the drawings, and the same discussion is not repeated.

First Exemplary Embodiment

Figure 1:
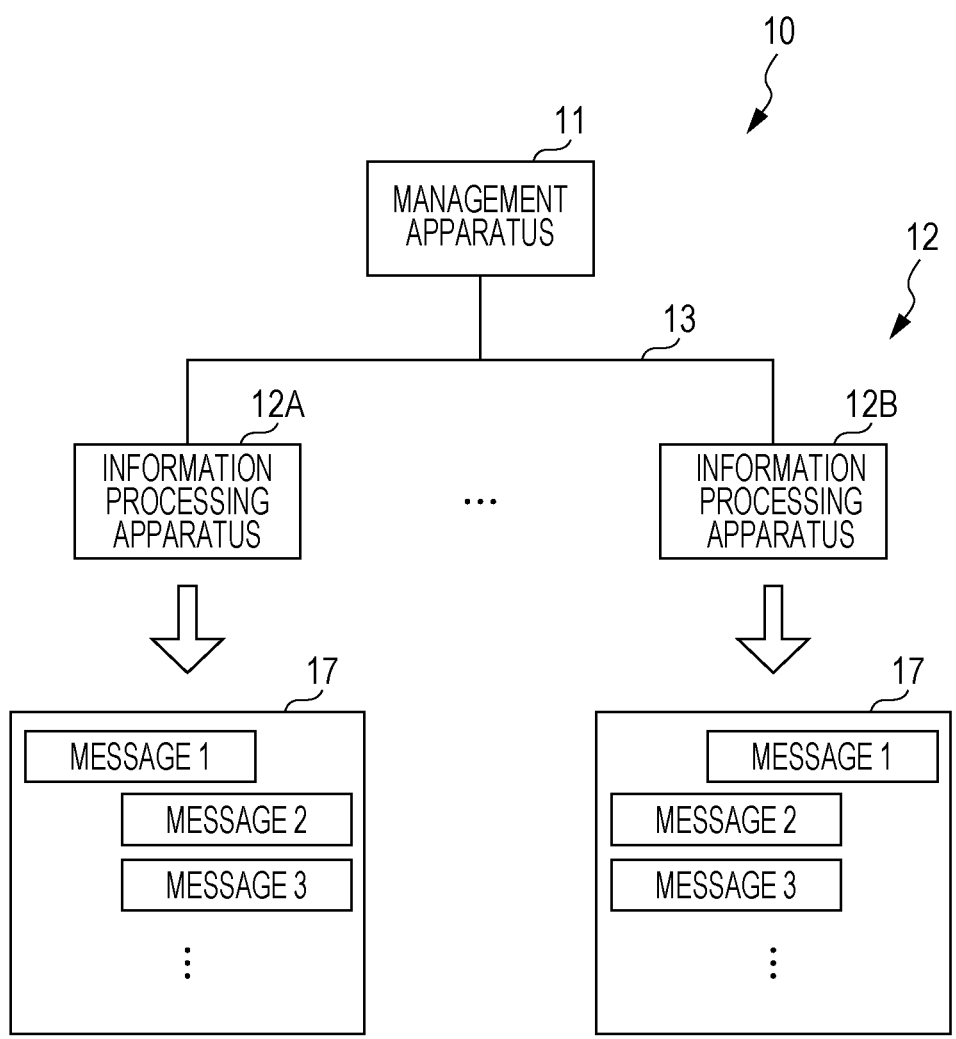
FIG. 1 illustrates a configuration of an information processing system.

FIG. 1 illustrates a configuration of an information processing system 10 of a first exemplary embodiment. The information processing system 10 includes a management apparatus 11 and information processing apparatuses 12.

The management apparatus 11 is connected to each of the information processing apparatuses 12 via a communication network 13. A message transmitted from each of the information processing apparatuses 12 is received by each of information processing apparatuses 12 via the management apparatus 11. In this way, a conversation via messages, namely, a chat is performed among the information processing apparatuses 12.

Specifically, a message transmitted from one of the information processing apparatuses 12 is received first by the management apparatus 11, and the management apparatus 11 transfers the received message to each information processing apparatus 12. The message transmitted by the information processing apparatus 12 is thus received by each information processing apparatus 12 in the information processing system 10. The transmission destination of the message may be specified by the information processing apparatus 12 as a sender. If the transmission destination is not particularly specified, the message is transmitted to each information processing apparatus 12 included in the information processing system 10.

The multiple information processing apparatuses 12 are collectively referred to as the information processing apparatus 12 in the above discussion. For convenience of explanation, if one information processing apparatuses 12 is differentiated from another information processing apparatus 12, the information processing apparatuses 12 may be differentiated by suffixing each information processing apparatus 12. For example, the information processing apparatuses 12 may be referred to as an information processing apparatus 12A and an information processing apparatus 12B.

The communication network 13 may include a wide area network (WAN), such as the Internet, but may also include an area communication network, such a local area network (LAN). The communication network 13 may be a wired network and/or a wireless network, and may be a public network and/or an exclusive network. The communication network 13 may connect to not only the management apparatus 11 and the information processing apparatuses 12, but also an external device, such as an external storage device. The information processing apparatus 12 may be a smart phone or a tablet.

A message received by each information processing apparatus 12 is displayed on a display region 17 of the screen of the display 15 included in the information processing apparatus 12. No particular restriction is imposed on the display form of the message received by the information processing apparatus 12 on the display region 17. Referring to FIG. 1, messages received from other information processing apparatuses 12 are displayed on a more leftward portion of the display region 17, and a transmission message transmitted by a host information processing apparatus 12 is displayed on a more rightward portion of the display region 17. As illustrated in FIG. 1, it is understood that a message 1 is transmitted by the information processing apparatus 12B, and that messages 2 and 3 are transmitted by the information processing apparatus 12A. Here, "message N" represents each message (N is a natural number).

With respect to the information processing apparatus 12 serving as a host apparatus, a message received is referred to as a "received message", and a message transmitted or to be transmitted is referred to as a "transmission message". At least one of the transmission message and the received message is simply referred to as a "message". The message may include, in addition to characters, graphics, such as an icon, a symbol, and an image, such as a photograph.

Figure 2:
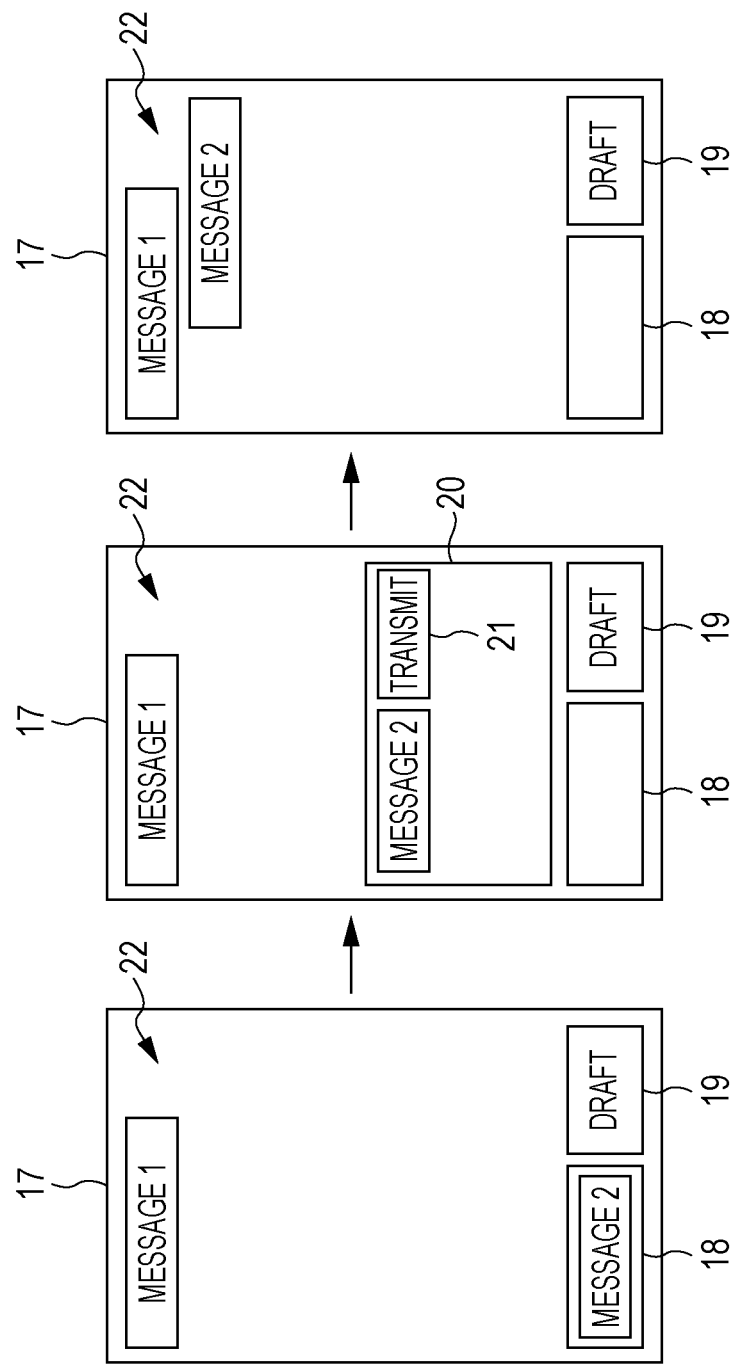
FIG. 2 illustrates an image example of a chat.

FIG. 2 illustrates an image example of a chat on the information processing apparatus 12.

Referring to FIG. 2, the display region 17 of the screen includes a message display region 22 that displays transmission messages and received messages, a message input region 18 in which a message is created by inputting characters or the like, and a draft button 19.

In order to transmit a response in response to the message 1 received from another information processing apparatus 12, a user of the information processing apparatus 12 (hereinafter simply referred to as a "user") enters a transmission message responsive to the message 1 on the message input region 18 and presses the draft button 19.

When the draft button 19 is pressed, a draft display region 20 is displayed on the message display region 22, a message 2 that is a transmission message responsive to the message 1 is displayed together with a transmit button 21 on the draft display region 20 and stored on a recording device. In this case, the display of the transmission message entered on the message input region 18 is deleted.

When the transmit button 21 is pressed, the message 2 in the draft display region 20 is transmitted from the information processing apparatus 12 and the management apparatus 11 transfers the message 2 to each of the information processing apparatuses 12 included in the information processing system 10. Specifically, the pressing of the transmit button 21 notifies the information processing apparatus 12 of a transmission instruction.

Upon receiving the message 2, the information processing apparatus 12 displays the received messages in time sequence from top to down on the message display region 22. Referring to FIG. 2, the message 2 that is a response to the message 1 is displayed beneath the message 1. This sequence is repeated as the users talk in conversation. The received messages are simply displayed in time sequence. For example, the received messages may be displayed from down to top on the message display region 22 or may be displayed laterally on the message display region 22.

FIG. 3 illustrates an example of a message management table managed by the management apparatus 11.

When the management apparatus 11 receives a transmission message from each of the information processing apparatuses 12, the management apparatus 11 records information included in each received transmission message in the message management table.

The message management table includes columns for a message identification (ID), message content, sender ID, start time of drafting, storage time of draft, transmission time, and link information.

The message ID column records an identifier that identifies a transmission message. The message content column records contents that are contained in the transmission message. The sender ID column records an identifier of a user who has transmitted the transmission message. The start time of drafting column records time at which the user begins drafting. The storage time of draft column records time and date on which the user has pressed the draft button 19. The transmission time column records time and date on which the user has pressed the transmit button 21. The link information column records a message ID indicating a message from a link destination to which the transmission message is transmitted.

The information processing apparatus 12 generates a transmission message including a variety of information managed in the message management table, and transmits the transmission message.

Note that the symbol "-" indicates that no message from the link destination is present. Specifically, a transmission message having no link information is not a response to any message, and is a message that indicates a startup point of a conversation unrelated to the other messages.

The symbol "-" in the transmission time column indicates that the transmit button 21 is not pressed for the transmission message that is displayed on the draft display region 20. When the draft button 19 is pressed and a transmission message is stored on a storage device, the information processing apparatus 12 transmits the stored draft message to the management apparatus 11 prior to the transmission of the transmission message to notify the management apparatus 11 that the transmission message has been drafted. Specifically, the management apparatus 11 records information contained in the stored draft message in the message management table when the stored draft message has been received in addition to the transmission message.

A message 4 illustrated in FIG. 3 is a transmission message displayed on the draft display region 20 with the draft button 19 pressed but is in a state with the transmit button 21 remains unpressed.

The information related to the transmission messages managed in the message management table is not limited to information of FIG. 3, but may include another piece of information. The format of the time and date of the storage time of draft and the transmission time are displayed for exemplary purposes only. For example, the time and date of the storage time of draft and the transmission time may be represented in units of milliseconds.

Figure 4:
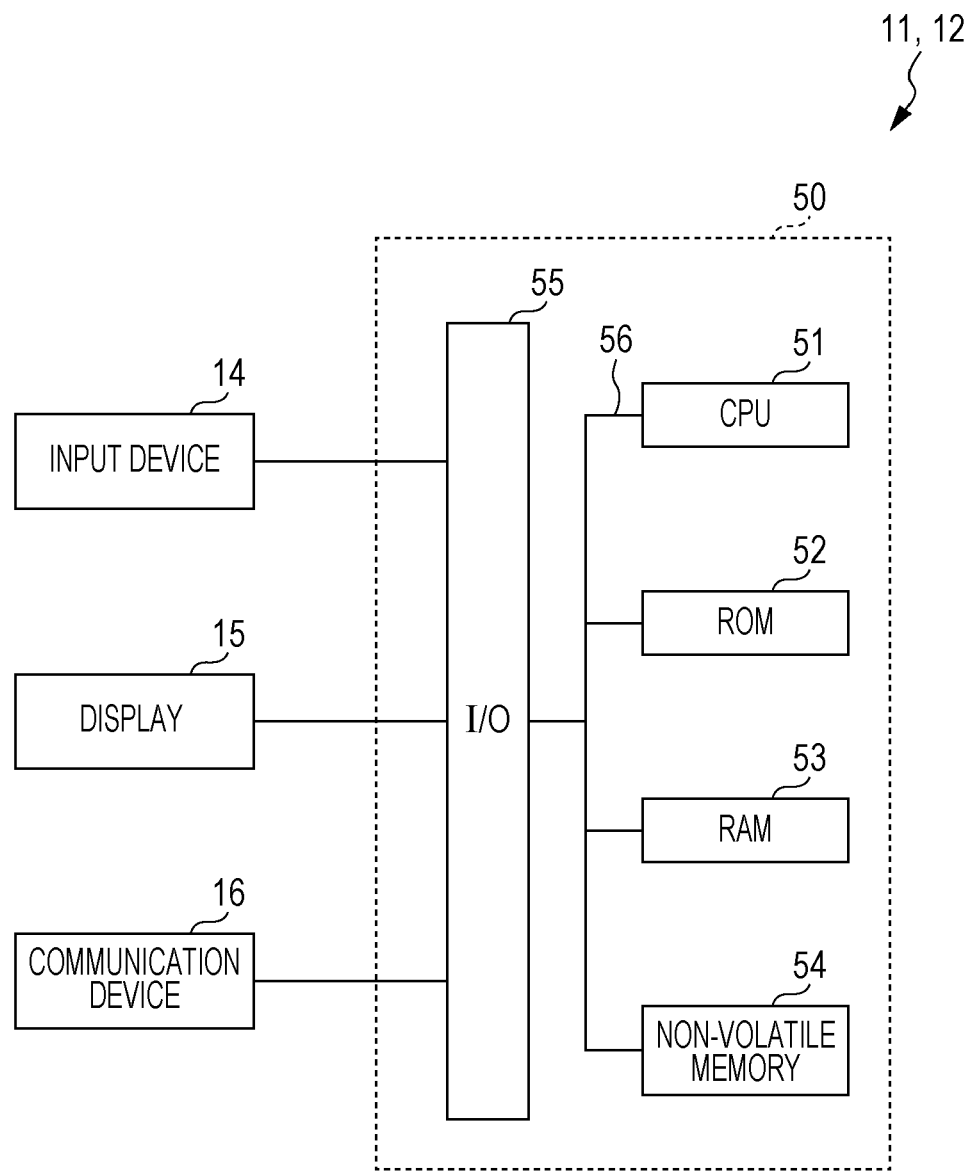
FIG. 4 illustrates an electronic system configuration of a management apparatus and an information processing apparatus.

Referring to FIG. 4, an electrical system configuration of each of the management apparatus 11 and the information processing apparatus 12 is described below. The management apparatus 11 and the information processing apparatus 12 may be implemented using a computer 50. The management apparatus 11 and the information processing apparatus 12 may be identical to each other in electrical system configuration. The electrical system configuration of the information processing apparatus 12 is representatively explained, and this discussion is also application to the management apparatus 11.

The information processing apparatus 12 is implemented using the computer 50. The computer 50 includes a central processing unit (CPU) 51 that is an example of a controller in the exemplary embodiment, a read only memory (ROM) 52, a random access memory (RAM) 53, a non-volatile memory 54, and an input and output (I/O) interface 55. The CPU 51, the ROM 52, the RAM 53, the non-volatile memory 54, and the I/O interface 55 are connected to each other via a bus 56.

The I/O interface 55 connects to an input device 14, a display 15, and a communication device 16.

The input device 14 notifies a user's instruction to the CPU 51. For example, the input device 14 may include a keyboard, a mouse, a touchpanel, and/or a microphone. Specifically, the input device 14 is an example of a receiving unit that receives a user's instruction.

The display 15 displays, as an image, information generated under the control of the CPU 51, and displays the display region 17 related to the chat illustrated in FIG. 2. The display 15 is an example of a display that displays transmission messages and received messages in time sequence on the display region 17.

The communication device 16 connects to the communication network 13, and works in accordance with a communication protocol that transmits or receives messages to or from the information processing apparatus 12 via the management apparatus 11.

The devices connected to the I/O interface 55 are not limited to those of FIG. 4. For example, a global positioning system (GPS) device may be connected to the I/O interface 55 to add, to the transmission message, position information indicating a location from which the transmission message is transmitted.

Figure 5:
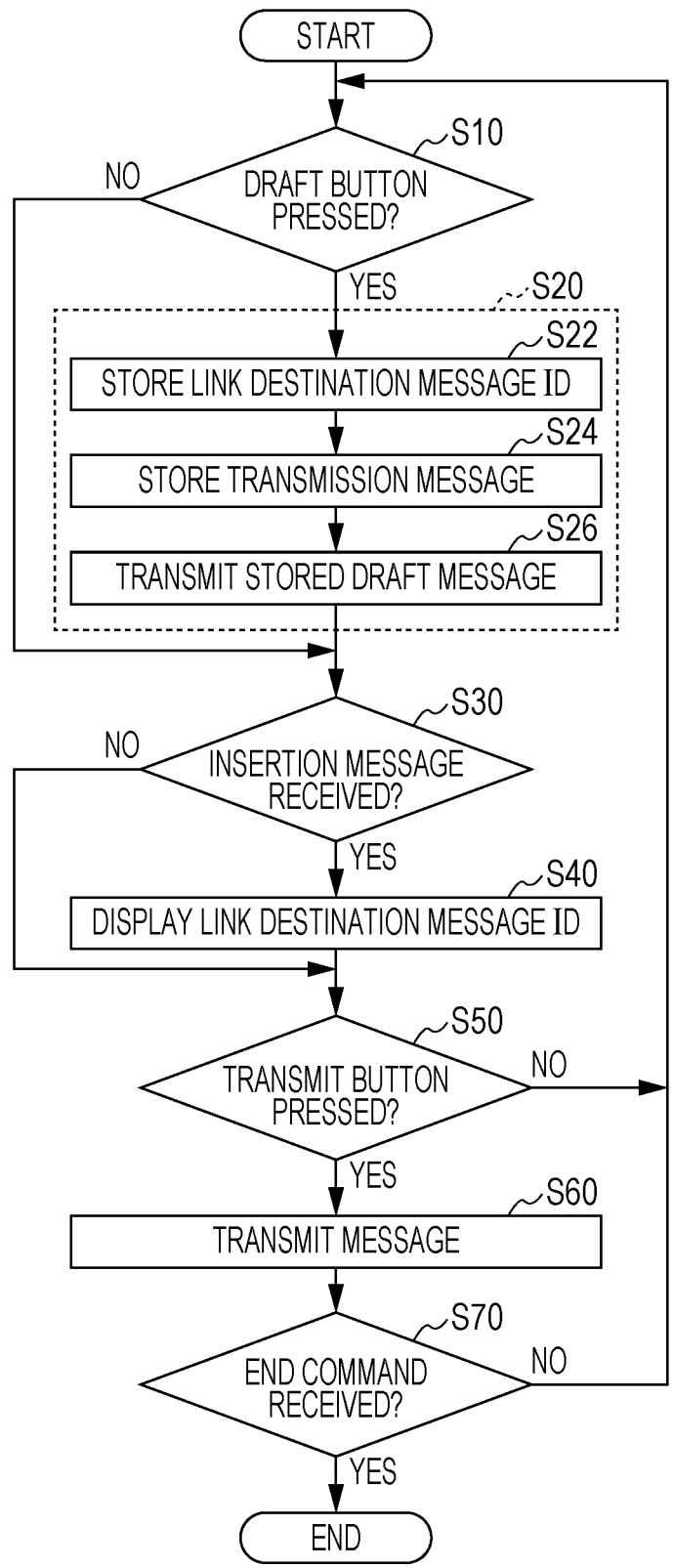
FIG. 5 is a flowchart illustrating a message transmission process of a first exemplary embodiment.
Figure 6:
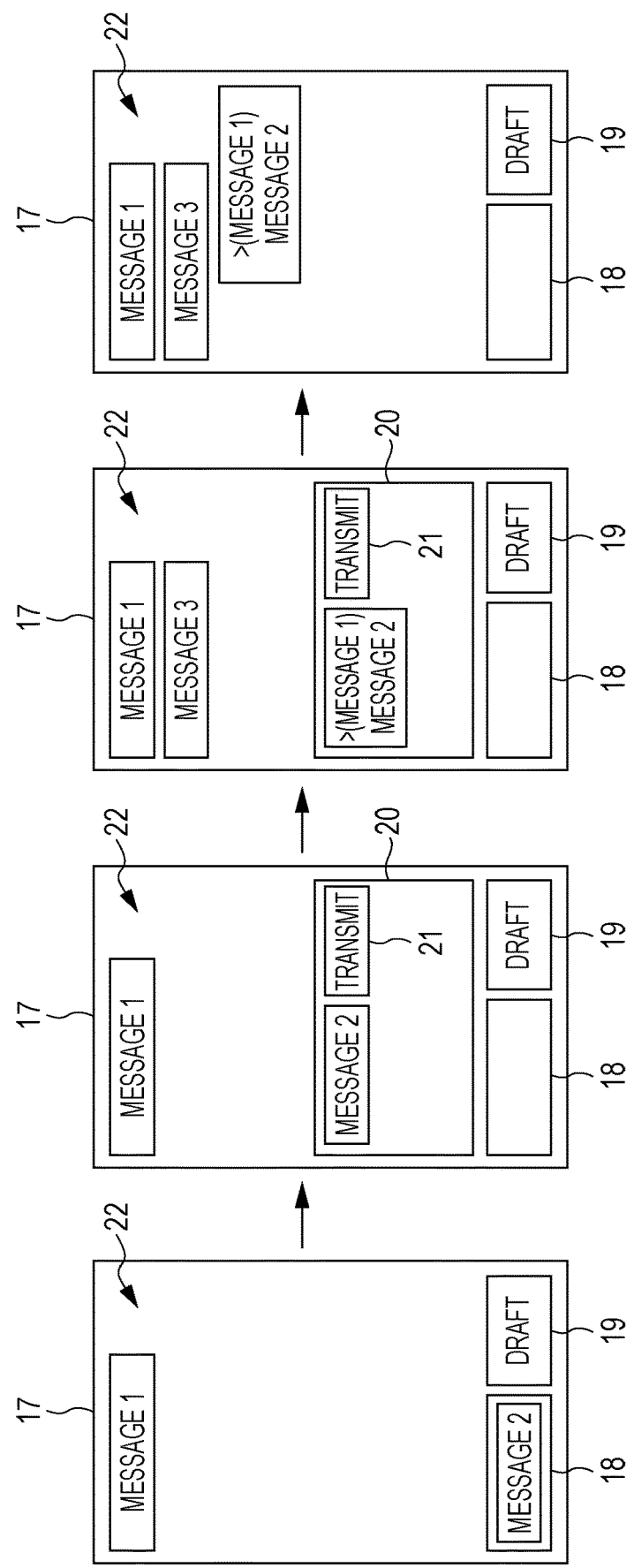
FIG. 6 illustrates a screen example of a chat in accordance with the first exemplary embodiment.

Referring to FIG. 5 and FIG. 6, the display form of messages in chats performed on the information processing apparatus 12 is described below.

FIG. 5 is a flowchart illustrating a message transmission process performed by the CPU 51 after the information processing apparatus 12 is powered on.

An information processing program that defines the message transmission process is typically pre-stored on the ROM 52. The CPU 51 reads the information processing program from the ROM 52, and executes the message transmission process.

In the process illustrated in FIG. 6, a transmission message (the message 2, for example) is transmitted in response to a message received from the information processing apparatus 12 (the message 1, for example).

In step S10, the CPU 51 receives click location information of a mouse that is an example of the input device 14, and determines whether the draft button 19 has been pressed. If the draft button 19 has been pressed, processing proceeds to step S20.

A drafting process of a transmission message is performed in step S20. The drafting process includes steps S22 through S26.

In step S22, the CPU 51 receives a message ID indicating a message from a link destination of the transmission message, namely, a link destination message ID, and stores the link destination message ID on the RAM 53. Specifically, the CPU 51 acquires the message ID of the message received most recently, from among the messages received until the draft button 19 is pressed, as the link destination message ID of the message from the link destination in the transmission messages input in the message input region 18. The message received most recently is also referred to as the "latest received message".

In step S24, the CPU 51 stores the transmission message input to the message input region 18 on the RAM 53, and erases the display of the transmission message from the message input region 18. Specifically, the message input region 18 becomes blank in response to the pressing of the draft button 19, and a next transmission message is allowed to be input.

The CPU 51 stores on the RAM 53 the time when the transmission message input in the message input region 18 is stored on the RAM 53. The time information may be acquired using a clock functionality of the CPU 51.

When the draft button 19 is pressed, the CPU 51 newly displays the draft display region 20 on the message display region 22. Referring to FIG. 2, the transmission message stored on the RAM 53 is displayed together with the transmit button 21 on the draft display region 20.

In step S26, the CPU 51 transmits the stored draft message to the management apparatus 11 to notify the management apparatus 11 that the transmission message has been drafted. The stored draft message includes the message ID of the transmission message, the message content, the storage time of the draft, and the link information having the link destination message ID set therewithin.

The transmission message input to the message input region 18 is first displayed on the draft display region 20 and is then transmitted in response to the user's instruction. The user may thus have time to verify the contents of the transmission message. This arrangement reduces more the possibility of transmitting a transmission message containing an error than when a transmission message input to the message input region 18 is directly transmitted without any time period to verify the contents of the transmission message.

The transmission message prior to transmission displayed on the draft display region 20 with the draft button 19 pressed may be referred to as a "transmission message being drafted". The transmission message displayed on the draft display region 20 with the draft button 19 pressed may be referred as being in an "in-draft state".

If the determination operation in S10 branches to "no" branch, in other words, the draft button 19 remains unpressed, processing proceeds to step S30 with the drafting process not performed in step S20.

In step S30, the CPU 51 determines whether an insertion message has been received. The "insertion message" refers to a message that is received when the transmission message is in the in-draft state. Referring to FIG. 6, the message 3 is the insertion message. When an insertion message is received, the insertion message is displayed immediately subsequent to the received message indicated by the link destination message ID acquired in step S22 on the message display region 22, in other words, immediately subsequent to the message (corresponding to the message 1 of FIG. 6) received from the link destination of the transmission message.

If the transmission message is transmitted in this state, the transmission message is displayed immediately subsequent to the insertion message. The transmission message may be understood as a response to the insertion message. In this arrangement, the flow of a conversation is difficult to follow in comparison with the case in which a transmission message is displayed immediately subsequent to the message from the link destination of the transmission message. When an insertion message is thus received, processing proceeds to step S40.

In step S40, the CPU 51 adds the link destination message ID stored on the RAM 53 in step S22 to the message content of the transmission message displayed on the draft display region 20 but with the link destination message ID thereof not yet displayed. The CPU 51 then displays the link destination message ID. In this way, the transmission message, if viewed, indicates which of the messages is a message from the link destination of the transmission message.

If the determination operation in S30 branches to "no" branch, in other words, if no insertion message has been received, the transmission message is displayed immediately subsequent to the message received from the link destination on the message display region 22 when the transmission message is transmitted. Specifically, without displaying the link destination message ID in the transmission message, the display position relationship indicates that the transmission message is a response to the message located immediately prior thereto. Processing proceeds to step S50 with the operation in step S40 skipped.

In step S50, the CPU 51 receives the click location information of a mouse, for example, and determines whether the transmit button 21 has been pressed. If the transmit button 21 has not been pressed, processing returns to step S10. Operations in steps S10 through S50 are iterated until the transmit button 21 has been pressed. If the transmit button 21 has been pressed, processing proceeds to step S60.

In step S60, the CPU 51 transmits a transmission message responsive to the pressing of the transmit button 21 to the management apparatus 11. The transmission message includes a variety of information managed in the message management table of FIG. 3. The CPU 51 attaches to the transmission message the link destination message ID stored on the RAM 53 in step S22 as the link information. The sender ID may be a user ID which is input to authenticate a user when the user starts chatting.

By transmitting the transmission message to the management apparatus 11, the transmission message transmitted from the information processing apparatus 12 of the user is transferred, and displayed on the message display region 22.

In step S70, the CPU 51 determines whether a chat end command has been received from the user. If the chat end command has not been received, processing proceeds to step S10 to continue the message transmission process. If the chat end command has been received, the message transmission process of FIG. 5 ends.

The message transmission process is performed as illustrated in FIG. 5. Referring to FIG. 6, an insertion message (the message 3, for example) may be received before transmitting a transmission message (the message 2, for example) that is a response message to a received message (the message 1, for example). In such a case, an association with the link destination is displayed in the transmission message. Referring to FIG. 6, line ">(message 1)" in the message 2 indicates the message from the link destination. Even if the transmission message is not displayed immediately subsequent to the message from the link destination, the message ID indicating the message of the link destination is displayed in the transmission message. The messages are thus displayed in time sequence. Even if one or more messages are displayed between the transmission message and the message from the link destination on the message display region 22, the relationship between the messages is recognized.

The association between the transmission message and the message from the link destination may be represented using a method other than displaying the message ID of the message from the link destination. For example, the entire message from the link destination may be used. Alternatively, the message from the link destination may be displayed in a link display such that the message from the link destination is displayed if the message displayed on the message display region 22 is clicked.

The message 1 that is received most recently, from among the messages received until the message 2 shifts to the in-draft state, is an example of a first received message, and the message 3 as the insertion message is an example of a second received message.

Figure 7:
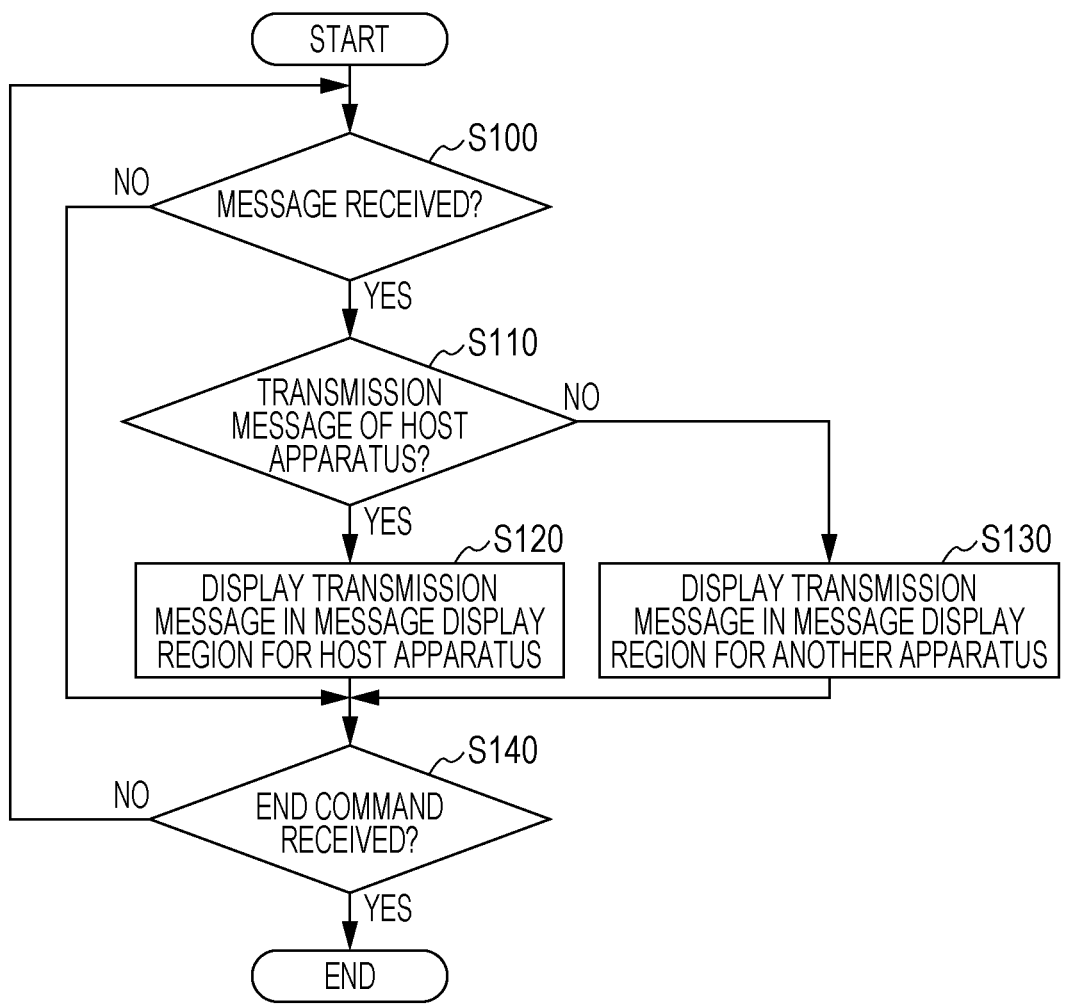
FIG. 7 is a flowchart illustrating an example of a message reception process.

FIG. 7 is a flowchart illustrating an example of a message reception process that is performed by the CPU 51 after the information processing apparatus 12 is switched on.

An information processing program defining the message reception process is pre-stored on the ROM 52. The CPU 51 reads the information processing program from the ROM 52 and executes the message reception process.

In step S100, the CPU 51 determines whether a message has been received. If no message has been received, processing proceeds to step S140. If a message has been received, processing proceeds to step S110.

In step S110, the CPU 51 determines whether the received message is a transmission message transmitted from the host information processing apparatus 12. Specifically, the CPU 51 determines whether the received message is a received message corresponding to the transmission message transmitted from the host information processing apparatus 12 by referencing the sender ID included in the received message. If the determination operation in step S110 branches to yes branch, processing proceeds to step S120.

In step S120, the CPU 51 displays the received message on the message display region 22 in a manner that clearly indicates that the received message is a received message corresponding to the transmission message from the host information processing apparatus 12. For example, the received message is displayed on a rightward portion of the message display region 22 as illustrated in FIG. 6.

If the determination operation in step S110 branches to no branch, processing proceeds to step S130.

In step S130, the CPU 51 displays the received message on the message display region 22 in a manner that clearly indicates that the received message is a received message corresponding to the transmission message transmitted from an information processing apparatus 12 different from the host information processing apparatus 12. As illustrated in FIG. 6, for example, the received message is displayed on a rightward portion of the message display region 22.

In displaying the received message on the message display region 22, the CPU 51 may display at least one of the sender ID, the message ID, the storage time of draft, and the transmission time in addition to the message content of the received message in each of steps S120 and S130. If a message ID is used to associate a message with a response, the CPU 51 displays the message ID of the received message in addition to the message content of the received message on the message display region 22.

There is no restriction on a display method of displaying a received message on the message display region 22 as long as the display method displays received messages in time sequence and clearly indicates the association of the messages.

In step S140, the CPU 51 determines whether an end command to end chatting has been received from the user. If the end command has not been received, processing returns to step S100 to continue the message reception process. On the other hand, if the end command has been received, the message reception process of FIG. 7 ends.

The information processing apparatus 12 of the first exemplary embodiment clearly displays in the transmission message the message from the link destination to which the transmission message is to be transmitted if the insertion message has been received. By displaying the messages in time sequence, the association of the messages is recognized even if at least one message is displayed between the transmission message and the message from the link destination of the transmission message on the message display region 22.

The information processing apparatus 12 performs the drafting process of the transmission message that is input to the message input region 18 with the draft button 19 pressed. The execution timing of the drafting process of the transmission message is not limited to this timing. For example, the information processing apparatus 12 may autonomously determine the execution timing of the drafting process of the transmission message instead of responding to a command from the user.

Figure 8:
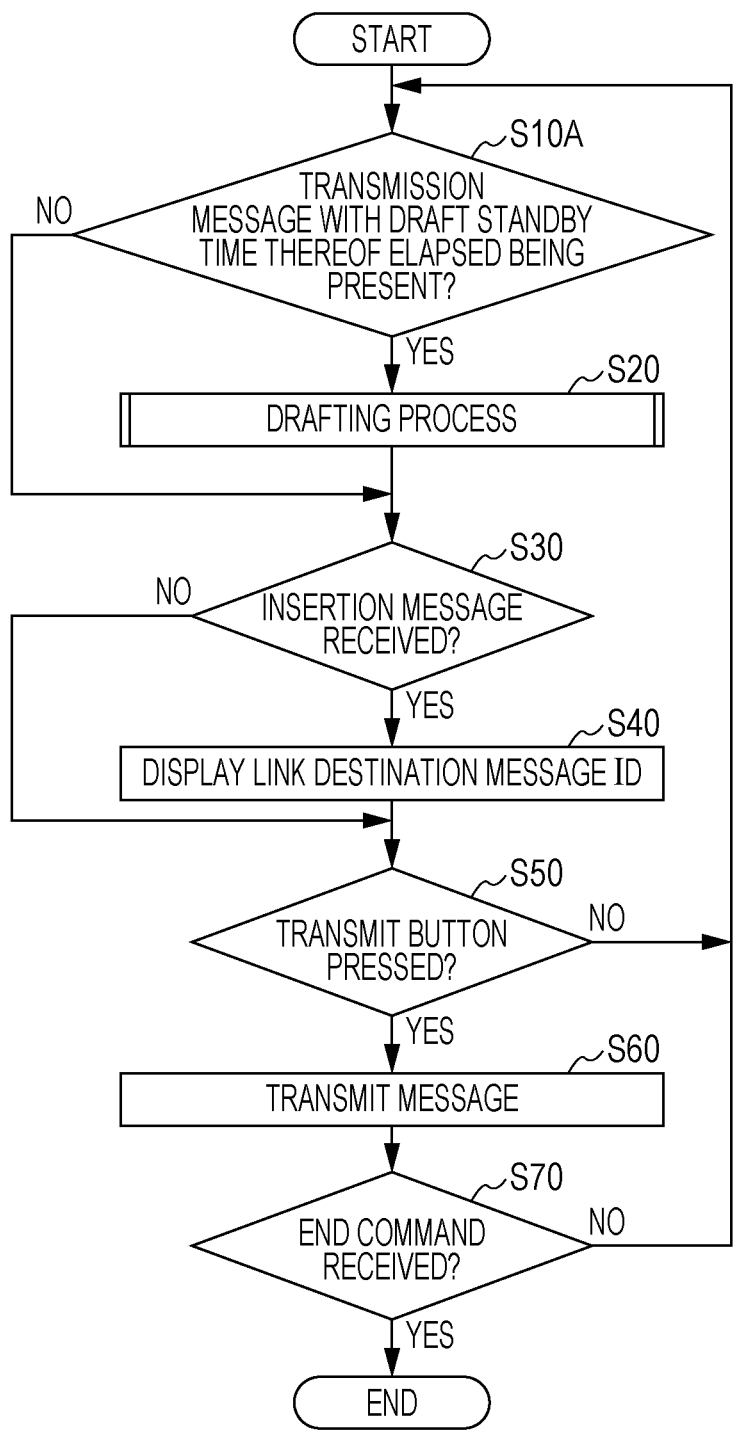
FIG. 8 is a flowchart illustrating a message transmission process that autonomously determines an execution timing of a drafting process of a transmission message.

FIG. 8 is a flowchart illustrating a message transmission process in which the information processing apparatus 12 autonomously determines the execution timing of the drafting process of the transmission message.

An information processing program defining the message transmission process is pre-stored on the ROM 52. The CPU 51 reads the information processing program from the ROM 52 and performs the message transmission process.

The message transmission process of FIG. 8 is different from the message transmission process of FIG. 5 in that step S10A is used in place of step 10 in the message transmission process of FIG. 8. The rest of the message transmission process of FIG. 8 remains unchanged from the message transmission process of FIG. 5.

In step S10A, the CPU 51 acquires the present time, and determines whether any transmission message is present that has a difference, between the start time of drafting a transmission message input to the message input region 18 and the present time, being equal to or longer than a draft standby time.

If the determination operation in step S10A branches to no branch, in other words, any transmission message having time from beginning writing the transmission message on the message input region 18 to pressing the draft button 19 exceeding the draft standby time is not present on the message input region 18, processing proceeds to step S30. Operations in steps S10A through S50 are iterated until a transmission message being drafted and having time exceeding the draft standby time is detected.

If the determination operation in step S10A branches to yes branch, in other words, a transmission message having time from beginning writing the transmission message on the message input region 18 to pressing the information processing apparatus 12 exceeding the draft standby time is present on the message input region 18, processing proceeds to step S20. In step S20, the drafting process of the transmission message is performed.

Without the user indicating the execution timing of the drafting process, the transmission message with time having elapsed the draft standby time and written on the message input region 18 is stored on the RAM 53, and the stored draft message is transmitted to the management apparatus 11.

The draft standby time is set to be time that the user uses to verify or correct the contents of the transmission message written on the message input region 18. The draft standby time may be determined based on actual writing time on the message input region 18. The draft standby time may be pre-stored in a predetermined region of the non-volatile memory 54.

Second Exemplary Embodiment

In accordance with the first exemplary embodiment, the number of messages in the in-draft state is one. Multiple messages may be in the in-draft state. In accordance with a second exemplary embodiment, the information processing apparatus 12 transmits a transmission message when multiple transmission messages are in the in-draft state.

The electrical configuration of each of the management apparatus 11 and the information processing apparatus 12 in the second exemplary embodiment is identical to the electrical configuration of FIG. 4.

Figure 9:
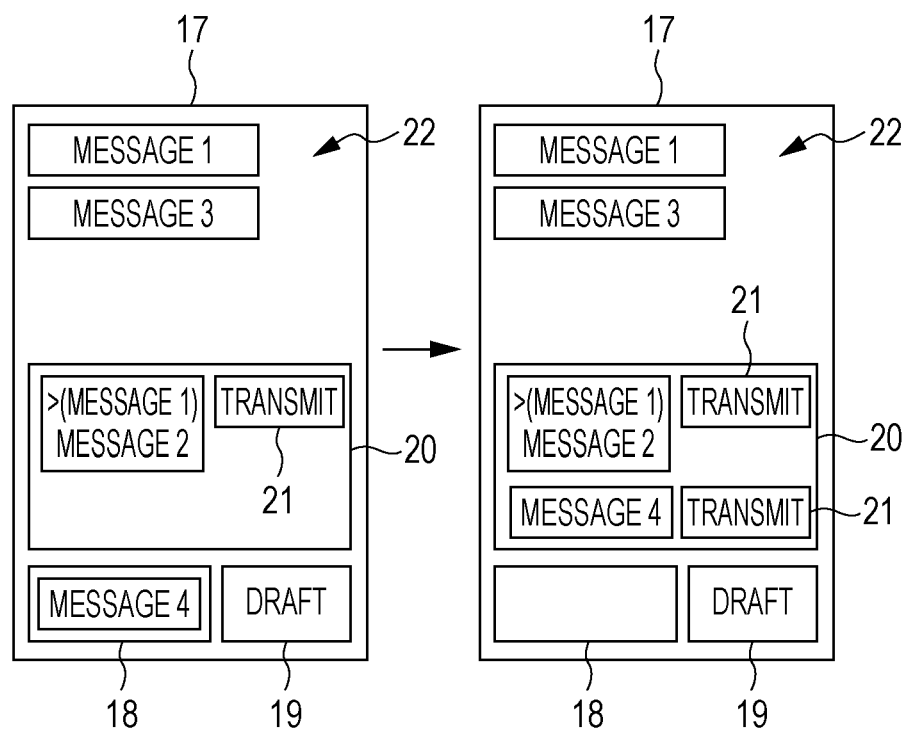
FIG. 9 illustrates a screen example of a chat in accordance with a second exemplary embodiment.

FIG. 9 illustrates a screen example displayed on the display 15 when multiple transmission messages are present in the in-draft state.

Referring to FIG. 9, a message 2 as a message responsive to a message 1 is set to be in the in-draft state before a message 3 is received as an insertion message, and a message 4 is input to the message input region 18.

If the draft button 19 is pressed in such a state, the message 4 is additionally displayed immediately subsequent to the message 2 displayed on the draft display region 20. The message 4 is set to be in the in-draft state. In this case, the transmit button 21 is also displayed for each message displayed on the draft display region 20.

As described with reference to step S22 in the message transmission process of FIG. 5, the information processing apparatus 12 associates, with a transmission message, a message received closest to a time point when the draft button 19 is pressed as a message from the link destination. The message 3 is thus associated with the message 4 as illustrated in FIG. 9.

However, if the association between the transmission message and the message from the link destination is determined by the pressing timing of the draft button 19, the message association may not meet what the user intends. For example, in the example of FIG. 9, the user may possibly intend to transmit the message 4 as a response to the message 1.

The information processing apparatus 12 of the second exemplary embodiment sets a message from the link destination in a transmission message having the longest time in the in-draft state, namely, in a transmission message that remains in the in-draft state from the transmission time of a leading transmission message.

Figure 10:
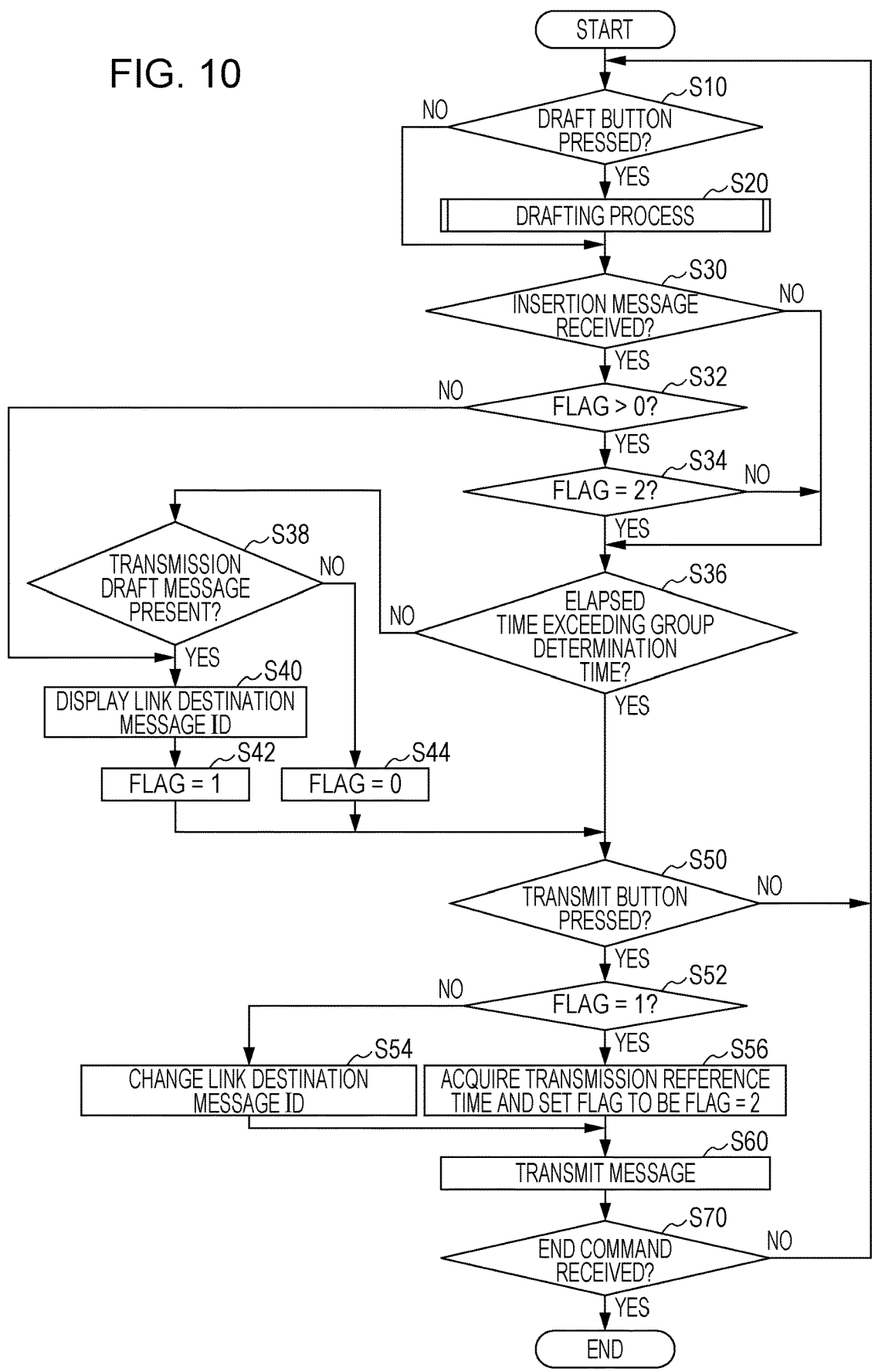
FIG. 10 is a flowchart illustrating an example of a message transmission process of the second exemplary embodiment.

FIG. 10 is a flowchart illustrating an example of the message transmission process performed by the CPU 51 after the information processing apparatus 12 is powered on.

An information processing program defining the message transmission process is pre-stored on the ROM 52. The CPU 51 reads the information processing program from the ROM 52 and performs the message transmission process.

The message transmission process of FIG. 10 is different from the message transmission process of FIG. 5 in that the message transmission process of FIG. 10 additionally includes steps S32 through S38, S42, S44, and S52 through S56.

In the discussion that follows, multiple transmission messages are transmitted in response to a message received from another information processing apparatus 12. A state variable flag indicating that a transmission message is in the in-draft state is set to a default value "0".

When an insertion message is received with a transmission message being drafted present as illustrated in FIG. 10, processing proceeds to step S32.

In step S32, the CPU 51 determines whether the state variable flag is "0" or not. If the state value flag is 0, processing proceeds to step S40. The CPU 51 displays a link destination message ID in the transmission message being drafted. Referring to FIG. 9, the message 3 is received while the message 2 is being drafted as a transmission message responsive to the message 1. The line ">(message 1)" is displayed together with the message 2.

In step S42, the CPU 51 sets the state variable flag to "1". The state variable flag of 1 indicates that an insertion message is received while a leading transmission message is being drafted. Specifically, the leading transmission message is not yet transmitted with the state variable flag of 1.

Referring to FIG. 9, if the draft button 19 is pressed for the message 4, and the transmit button 21 is then pressed for the leading transmission message, namely, the message 1 after the message 4 is shifted to the in-draft state, the determination operation in step S50 branches to yes branch, and processing proceeds to step S52.

In step S52, the CPU 51 determines whether the state variable flag is "1". Since the state variable flag of 1 means the transmission of the leading transmission message, the CPU 51 acquires the present time and stores the present time as transmission reference time on the RAM 53. The CPU 51 sets the state variable flag to "2". The state variable flag of 2 indicates that the leading transmission message from among multiple transmission messages being drafted is transmitted.

After the leading transmission message is transmitted in step S60, the message transmission process of FIG. 10 is iterated until an end command is received. In the iteration of the message transmission process, step S36 is repeated in each cycle.

In step S36, the CPU 51 acquires the present time, and calculates elapsed time from the transmission reference time acquired in step S56. The CPU 51 determines whether the elapsed time calculated in step S36 falls within a group determination time period.

The group determination time period is a threshold value that is used to determine whether a transmission message being drafted to be transmitted in succession to the leading transmission message transmitted is a transmission message in a series of transmission messages related to the leading transmission message. The group determination time period is set in advance to be a time period according to which the transmission message being drafted that is transmitted within the group determination time period from the transmission of the leading transmission message is determined to be a transmission message responsive to a message from the same link destination of the leading transmission message.

If the determination operation in step S36 branches to yes branch, and the transmit button 21 is pressed for the transmission message being drafted, the message 4 in FIG. 9, the determination operation in step S50 branches to yes branch, and processing proceeds to step S52.

Since the state variable flag is "2", the determination operation in step S52 branches to no branch, and processing proceeds to step S54.

As previously described, the transmission message is a transmission message that is transmitted within the group determination time period from the transmission reference time at which the leading transmission message has been transmitted. It is thus understood that the transmission message is in the series of the transmission messages related to the leading transmission message, namely, is the transmission message within the same group as the leading transmission message.

In step S54, the CPU 51 changes from the link destination message ID, associated with the transmission message being drafted with the transmit button 21 pressed during the drafting process in step S20, to the link destination message ID associated with the leading transmission message. Referring to FIG. 9, for example, the message 4 prior to the pressing of the transmit button 21 is associated with the "message 3" as the link destination message ID. With the transmit button 21 pressed for the message 4, the link destination message ID of the message 4 is associated with the "message 1" in the same way as the message 2.

Figure 11:
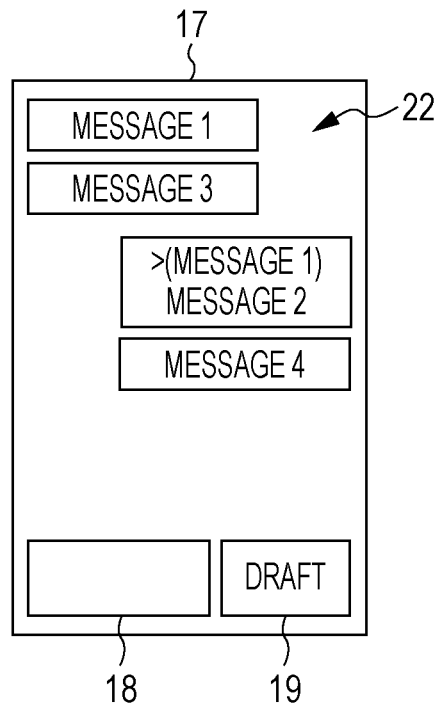
FIG. 11 illustrates a display example of transmission messages transmitted within a group determination time period.

From among the transmission messages in the same group as the leading transmission message, the link destination message ID of only the leading transmission message that has been transmitted first is displayed. As illustrated in FIG. 11, no link destination message ID is displayed for the message 4. Since the message 4 is displayed immediately subsequent to the message 2 that is definitely a message responsive to the message 1, the message 4 is also recognized as a message responsive to the message 1.

If multiple transmission messages are transmitted within the group determination time period, the multiple transmission messages may be determined to have the same link destination. The condition that the multiple transmission messages are transmitted within the group determination time period is an example of a first condition.

If the determination operation in step S36 branches to no branch, specifically, if the elapsed time from the transmission reference time exceeds the group determination time period, processing proceeds to step S38.

In such a case, the transmission message transmitted hereinafter is determined to be a transmission message not related to the leading transmission message, namely, a transmission message in a group different from the group of the leading transmission message.

In step S38, the CPU 51 determines whether any transmission message is being drafted. If a transmission message is being drafted, processing proceeds to step S40.

In step S40, the CPU 51 selects the transmission message having the longest time elapsed from being shifted to the in-draft state as a new leading transmission message from among the transmission messages being drafted. The CPU 51 adds the link destination message ID associated in the drafting process of step S20 to the message content of the selected leading transmission message, and displays the link destination message ID. Since the leading transmission message is not transmitted, the CPU 51 sets the state variable flag to "i" in step S42.

If the transmit button 21 is pressed for the newly selected leading transmission message, the leading transmission message with the message from the link destination added is displayed on the message display region 22.

Figure 12:
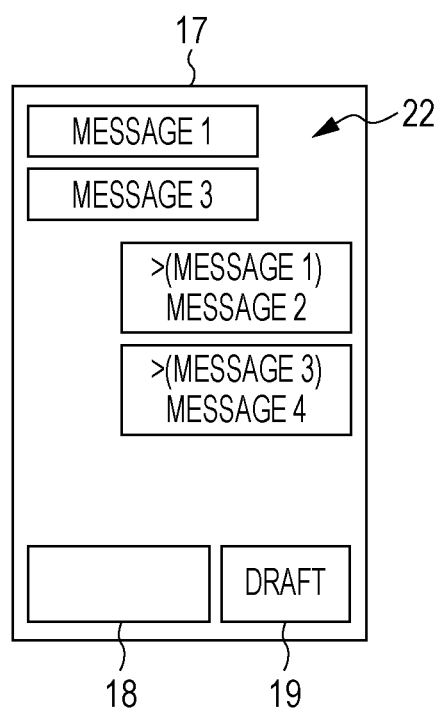
FIG. 12 illustrates a display example of transmission messages that are transmitted after the elapse of the group determination time period.

FIG. 12 illustrates this status. Referring to FIG. 12, the message 4 that is transmitted after the elapse of the group determination time period subsequent to the transmission of the message 2 is displayed together with the message ID of the message 3 that is the link destination message ID associated at the pressing of the draft button 19.

If the determination operation in step S38 branches to no branch with no transmission message being drafted, processing proceeds to step S44. The CPU 51 initializes the state variable flag to "0".

The message transmission process of FIG. 10 has been described with reference to FIG. 9 when the two transmission messages being drafted are used. The number of transmission messages may be three or more.

For example, if three transmission messages or more are transmitted within the group determination time period, a message from the link destination is displayed for only a leading transmission message but is not displayed for the remaining transmission messages. The same link destination message ID as that of the leading transmission message is attached to each transmission message as the link information.

The information processing apparatus 12 of the second exemplary embodiment groups transmission messages being drafted according to the elapsed time from the transmission reference time of the leading transmission message, and associates transmission messages in the same group with the same link destination message ID as the link destination message ID associated with the leading transmission message. The information processing apparatus 12 displays the message from the link destination for only the transmission message that is to be transmitted first, from among the transmission messages. The message from the link destination is associated with multiple transmission messages without the user specifying the message from the link destination.

In the above example, the information processing apparatus 12 groups the transmission messages being drafted in accordance with the elapsed time from the transmission reference time of the leading transmission message. The method of grouping the transmission messages is not limited to the above-described method. For example, the user may select transmission messages being drafted to be grouped.

Figure 13:
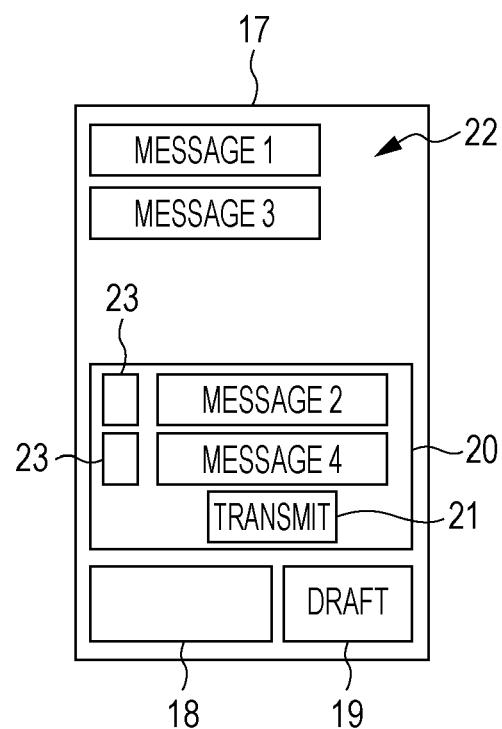
FIG. 13 illustrates a screen example of a chat in which a group selection is performed.

FIG. 13 illustrates a screen example displayed on the display 15 when the user selects the transmission messages being drafted for grouping.

Check boxes 23 are respectively displayed for the transmission messages being drafted on the draft display region 20. The user may click on the check box 23 corresponding to a transmission message that the user desires to group. The user may thus specify the transmission messages with the check boxes 23 thereof checked to be grouped. With the user clicking on the check box 23, a select command of the transmission message is notified to the CPU 51.

When the user presses (clicks on) the transmit button 21 in that state, the CPU 51 associates each of the transmission messages in the groups with the same message ID as the link destination message ID associated with the leading transmission message among the transmission messages in the groups. From among the transmission messages in the same group, the message from the link destination is displayed for only the leading transmission message that is to be transmitted first.

If each of the transmission messages is selected, the transmission messages are determined to have the same link destination. The condition that each of the transmission messages is selected is an example of the first condition.

Third Exemplary Embodiment

The information processing apparatuses 12 of the first and second exemplary embodiments display the link destination message ID, representing the message from the link destination of the transmission message, for the transmission message if the insertion message is received while the transmission message is being drafted.

The insertion message may include a message that does not affect the flow of a conversation. If a transmission message is transmitted after the message that does not affect the flow of the conversation, that message that does not affect the flow of the conversation is displayed between the transmission message and the message from the link destination of the transmission message. The transmission message may thus be displayed immediately subsequent to the message that does not affect the flow of the conversation. However if the user views the contents of the message between the message from the link destination and the transmission message, the user may understand that the message from the link destination of the transmission message is not the received message that is displayed immediately prior to the transmission message.

The information processing apparatus 12 of the third exemplary embodiment performs as described below when the message that does not affect the flow of a conversation is received.

In the discussion that follows, the message not affecting the flow of the conversation out of the messages received by the information processing apparatus 12 is referred to as a "particular received message". The electrical configuration of each of the management apparatus 11 and the information processing apparatus 12 is identical to the electrical configuration of FIG. 4.

Figure 14:
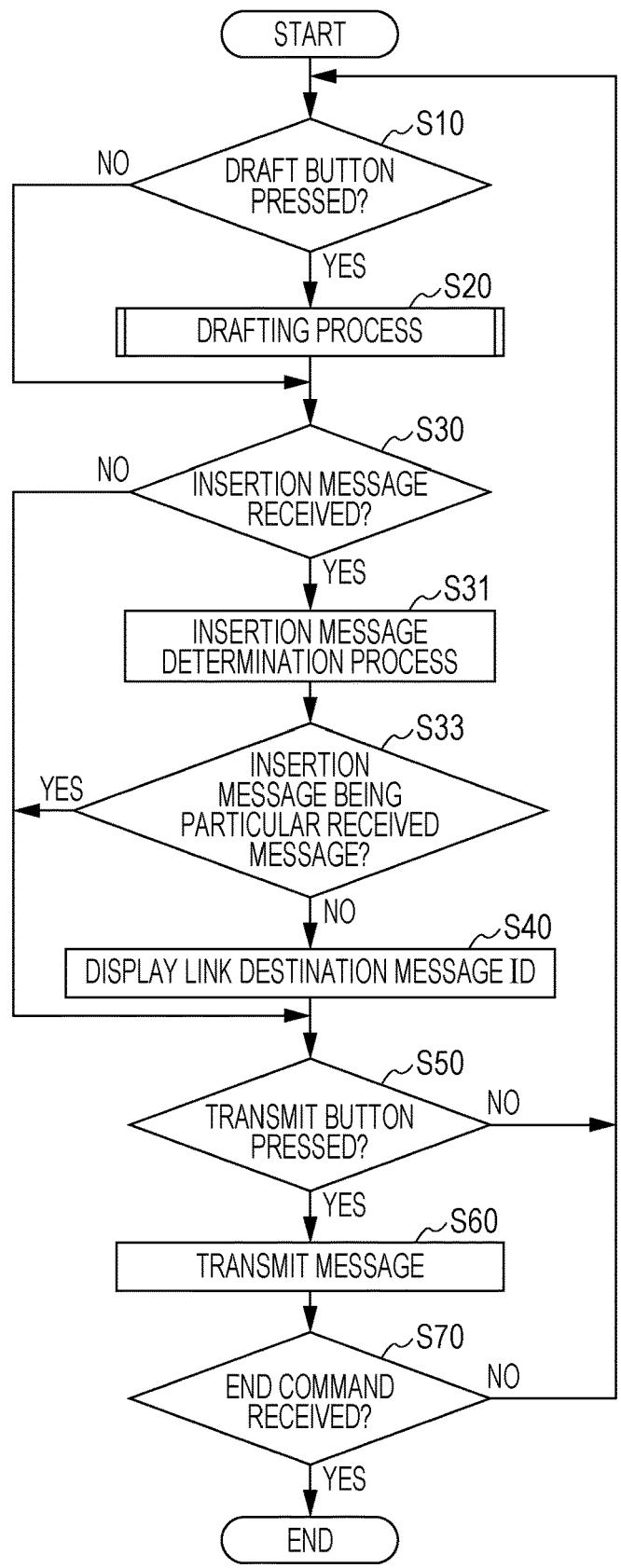
FIG. 14 is a flowchart illustrating an example of a message transmission process of a third exemplary embodiment.

FIG. 14 is a flowchart illustrating a message transmission process performed by the CPU 51 after the information processing apparatus 12 is powered on.

An information processing program defining the message transmission process is pre-stored on the ROM 52. The CPU 51 reads the information processing program from the ROM 52 and performs the message transmission process.

The message transmission process of FIG. 14 is different from the message transmission process of the first exemplary embodiment of FIG. 5 in that the message transmission process of FIG. 14 additionally includes steps S31 and S33. A transmission message is transmitted in response to a message received from another information processing apparatus 12.

Referring to FIG. 14, when an insertion message is received with a transmission message being drafted present, processing proceeds to step S31.

In step S31, the CPU 51 performs an insertion message determination process to determine whether the received insertion message is a particular received message.

The feature of the message not affecting the flow of a conversation tends to be relatively shorter in the number of characters, such as "O.K." or "Goodbye". The CPU 51 measures the number of characters of the insertion message, and if the measured number of characters is equal to or below a threshold value, the CPU 51 determines that the received insertion message is a particular received message.

The determination method of the particular received message is not limited to the method described above. For example, the contents of the particular received message are pre-stored on the non-volatile memory 54, and the CPU 51 determines that the received insertion message is the particular received message if the contents of the received insertion message are identical to the contents of the particular received message stored on the non-volatile memory 54.

The CPU 51 may calculate an index indicating the degree of relationship between the contents of the received insertion message and the contents of the transmission message being drafted may be calculated, and may determine in accordance with the calculated index whether the received insertion message is a particular received message.

The CPU 51 defines as a "message distance" an index that is set to increase in value as the degree of relationship between the contents of the received insertion message and the contents of the transmission message being drafted decreases. If the message distance exceeds a reference distance, the CPU 51 determines that the received insertion message is a particular received message.

The message distance may be obtained as an output of a neural network that performs deep learning with a combination of variety of two messages serving as a learning sample, and with the presence or absence of a relationship in each combination serving as teaching data. Alternatively, the message distance may be calculated using another related art technique.

As described above, the contents of the particular received message are pre-stored on the non-volatile memory 54, and the CPU 51 determines that the received insertion message is a particular received message if the contents of the received insertion message are identical to the contents of the particular received message stored on the non-volatile memory 54. The message distance between the received insertion message and the particular received message stored on the non-volatile memory 54 is calculated, and if the calculated message distance is equal to or below the reference distance, the CPU 51 determines that the received insertion message is a particular received message.

An example of a second condition is a condition that the number of characters in the insertion message is equal to or below a threshold value, that the contents of the insertion message are determined to be identical to the contents of the particular received message stored on the non-volatile memory 54, and that the message distance between the transmission message and the insertion message is above the reference distance.

In step S33, the CPU 51 references a determination result in step S31 to determine whether the received insertion message is a particular received message. If the received inserted image is not a particular received message, processing proceeds to step S40. In such a case, as described above, the link destination message ID is displayed for the transmission message being drafted.

On the other hand, if the received insertion message is a particular received message, processing proceeds to step S50 with the operation in step S40 skipped. Thus, no link destination message ID is displayed for the transmission message being drafted.

Figure 15:
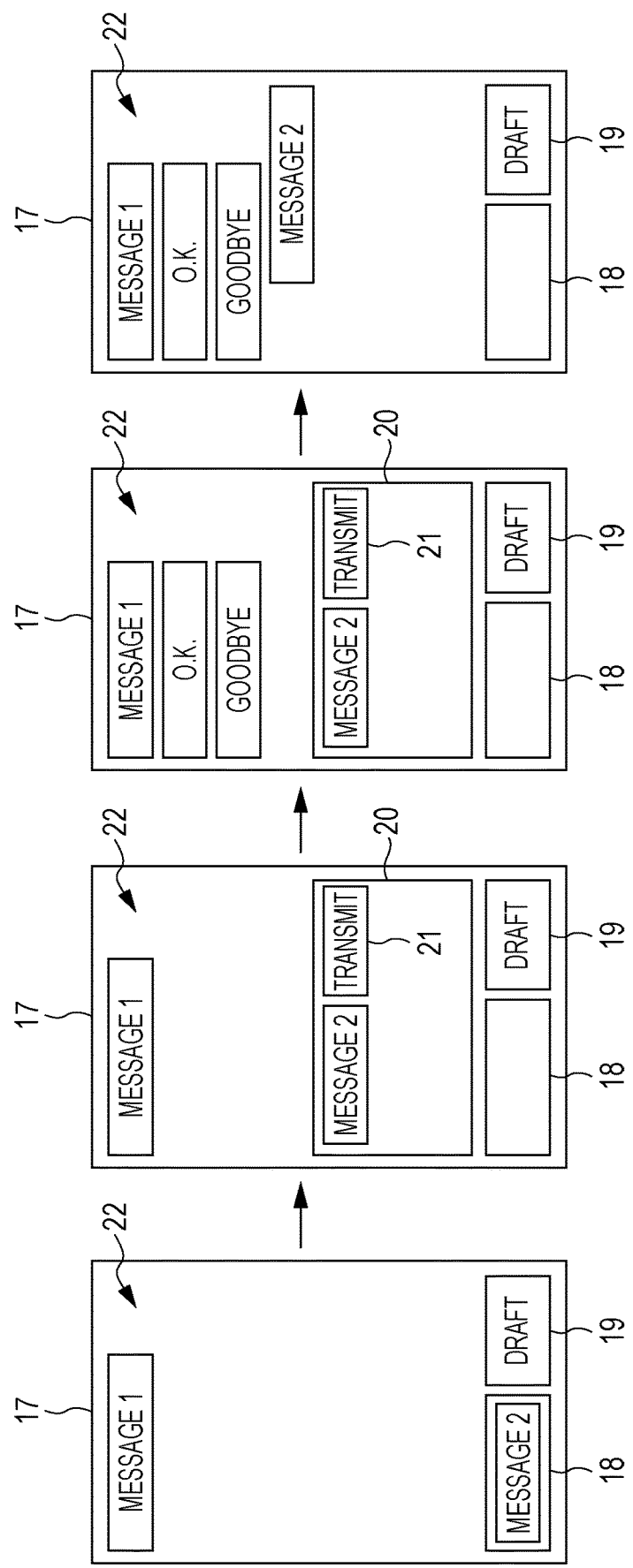
FIG. 15 illustrates a screen example displayed when the message transmission process of the third exemplary embodiment is performed.

FIG. 15 illustrates a screen example displayed when the message transmission process of FIG. 14 is performed.

Referring to FIG. 15, the insertion messages are "O.K." and "Goodbye", and the message 2 is the transmission message that is a message responsive to the message 1. "O.K." and "Goodbye" are respectively particular received messages. Even if the received messages "O.K." and "Goodbye" are displayed between the message 1 and the message 2, any message from the link destination is not displayed for the message 2.

The information processing apparatus 12 of the third exemplary embodiment does not display a message from the link destination for a transmission message if a message not affecting the flow of a conversation is not present between the transmission message transmitted and the message from the link destination of the transmission message.

The number of messages displayed on the display region 17 in time sequence increases more than when a message from the link destination is displayed for each of the transmission messages. The user may thus recognize the flow of a conversation more easily.

Fourth Exemplary Embodiment

Each of the information processing apparatuses 12 of the first through third exemplary embodiments determines and associates the message from the link destination of the transmission message, based on the pressing timing of the draft button 19 or a transmission time interval between the transmission messages.

In accordance with a fourth exemplary embodiment, an information processing apparatus 12 receives from the user an edit command for a message from the link destination of the transmission message, and associates, as a message from the link destination, a message that has been edited in response to the edit command, with a transmission message. The electrical configuration of each of the management apparatus 11 and the information processing apparatus 12 of the fourth exemplary embodiment is identical to the electrical configuration of FIG. 4.

Figure 16:
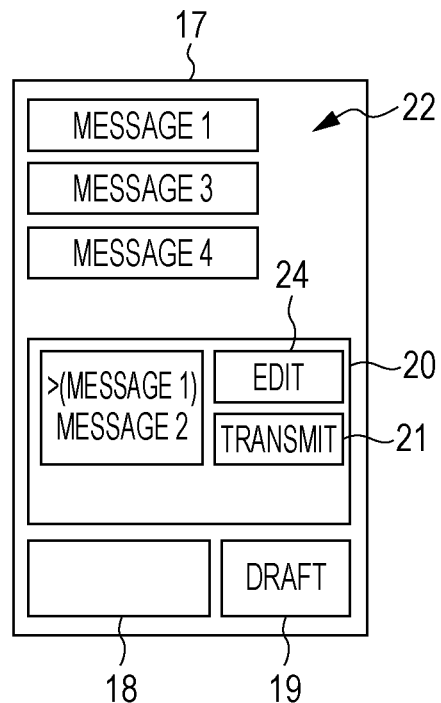
FIG. 16 illustrates a screen example of a chat in accordance with a fourth exemplary embodiment.

FIG. 16 illustrates a screen example displayed on the display 15 in the information processing apparatus 12 of the fourth exemplary embodiment.

An edit button 24 is displayed in addition to the transmit button 21 for a transmission message being drafted on the draft display region 20 of FIG. 16.

Figure 17:
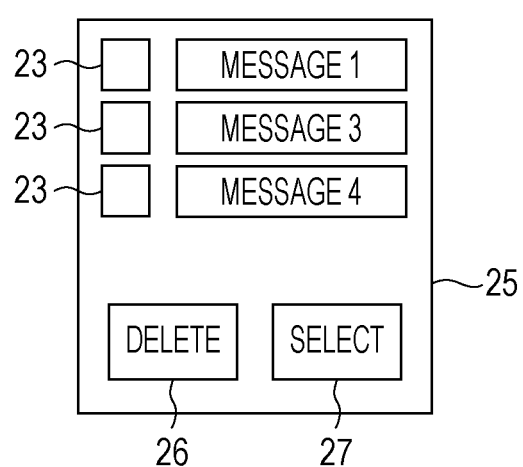
FIG. 17 illustrates an example of an edit dialog box.

FIG. 17 illustrates an example of an edit dialog box 25 displayed when the edit button 24 for the transmission message is pressed.

The edit dialog box 25 displays a message that is displayed on the message display region 22 at the time point when the edit button 24 is pressed. Referring to FIG. 17, the message 1, the message 3, and the message 4 are messages that have been displayed on the message display region 22 at the time point when the edit button 24 is pressed.

The check box 23 is displayed for each of the messages on the edit dialog box 25 and a delete button 26 and a select button 27 are also displayed on the edit dialog box 25. The edit dialog box 25 includes one check box 23 for each of the messages, but includes the single delete button 26 and the single select button 27.

Figure 18:
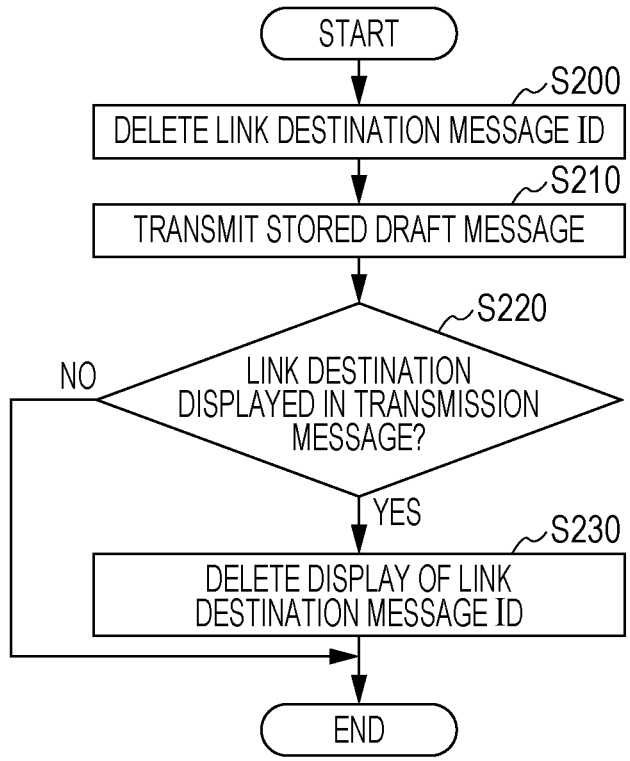
FIG. 18 is a flowchart illustrating an example of a link destination deletion process.

FIG. 18 is a flowchart illustrating an example of a link destination deletion process performed by the CPU 51 when the delete button 26 is pressed.

An information processing program defining the link destination deletion process is pre-stored on the ROM 52. The CPU 51 reads the information processing program from the ROM 52 and performs the link destination deletion process.

In step S200, the CPU 51 erases from the ROM 52 the link destination message ID associated with the transmission message with the edit button 24 pressed therefor (the transmission message serving as an edit target) to delete the association between the transmission message as the edit target and the message from the link destination of the transmission message.

In step S210, the CPU 51 transmits to the management apparatus 11 a stored draft message with the link information thereof loaded with no link destination message ID and thus left blank in order to notify that no message from the link destination is present in a transmission message that is to be edited. The contents of the transmission message serving as an edit target in the message management table managed by the management apparatus 11 are thus updated.

In step S220, the CPU 51 determines whether the link destination message ID representing a message from the link destination of the transmission message is displayed for the transmission message that is an edit target. If any link destination message ID is not displayed, no deletion operation is performed, and the link destination deletion process of FIG. 18 ends.

If a link destination message ID is displayed, processing proceeds to step S230.

In step S230, the CPU 51 deletes the link destination message ID displayed for the transmission message as the edit target.

The link destination message ID associated with the transmission message as an edit target is deleted, and the link destination message ID displayed for the transmission message as the edit target is also deleted.

Figure 19:
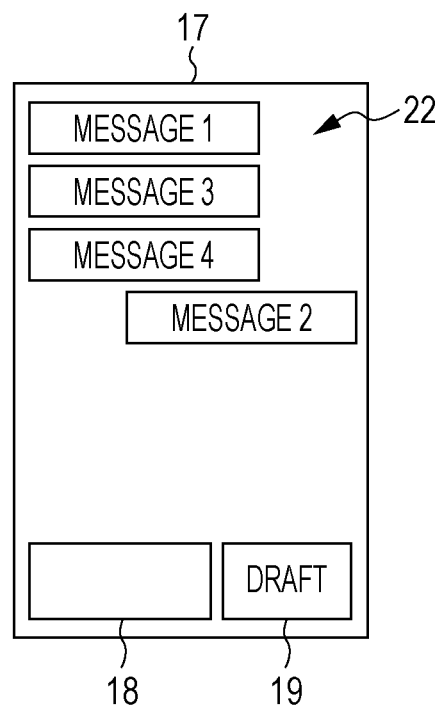
FIG. 19 illustrates a screen example displayed when the link destination deletion process is performed.

FIG. 19 illustrates a screen example displayed on the display 15 when the message 2 is transmitted after the link destination deletion process is performed on the message 2 in the display example of FIG. 16.

As illustrated in FIG. 19, line ">(message 1)" indicating the message from the link destination of the transmission message is deleted. In such a case, the link information attached to the transmission message of the message 2 is blank.

When the user presses the check box 23 associated with the message displayed in the edit dialog box 25 of FIG. 17 to display a check mark, and then presses the select button 27, a link destination change process is performed to change the messages from the link destination associated with the transmission message as the edit target.

Figure 20:
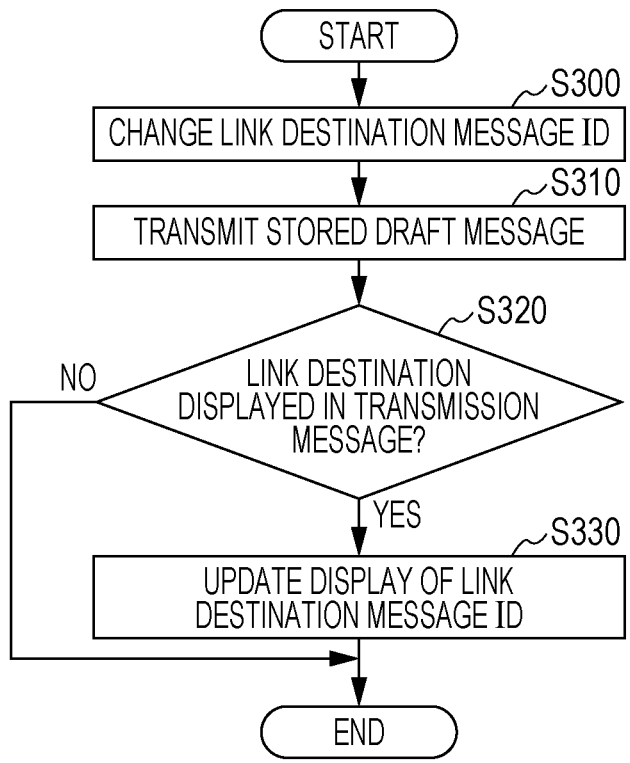
FIG. 20 is a flowchart illustrating an example of a link destination change process.

FIG. 20 is a flowchart illustrating the link destination change process performed by the CPU 51 when the select button 27 is pressed.

An information processing program defining the link destination change process is pre-stored on the ROM 52. The CPU 51 reads the information processing program from the ROM 52 and performs the link destination change process.

In step S300, the CPU 51 changes from the link destination message ID stored on the RAM 53 and associated with the transmission message serving as the edit target to the message ID of the message with the check box 23 thereof checked in the edit dialog box 25. In the discussion that follows, a message with the check box 23 checked (check mark displayed) in the edit dialog box 25 is referred to as a "selected message". Displaying a check mark by pressing (checking) the check box 23 corresponding to each message in the edit dialog box 25 is referred to as "selecting a message".

If multiple messages are selected, the link destination message ID associated with a transmission message serving as an edit target is changed to the message ID of each of the selected messages. In other words, the number of messages from the link destination of the transmission message may be multiple.

In step S310, the CPU 51 transmits to the management apparatus 11 the stored draft message with the message ID of the selected message set in the link information in order to notify that the message from the link destination is changed in the transmission message serving as the edit target. In this way, the contents of the transmission message serving as the edit target in the message management table on the management apparatus 11 are updated.

In step S320, the CPU 51 determines whether the link destination message ID indicating the message from the link destination of the transmission message is displayed in the transmission message serving as the edit target. If the link destination message ID is not displayed, the display of the link destination message ID is not changed. The link destination change process of FIG. 20 thus ends.

If the link destination message ID is displayed, processing proceeds to step S330.

In step S330, the CPU 51 changes from the link destination message ID displayed in the transmission message as the edit target to the link destination message ID of the selected message.

In this way, the link destination message ID associated with the transmission message as the edit target is changed and the link destination message ID displayed in the transmission message serving as the edit target is also changed.

Figure 21:
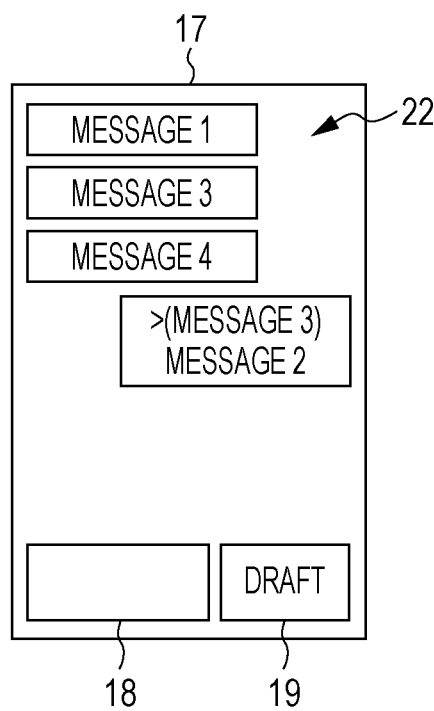
FIG. 21 illustrates a screen example displayed when the link destination change process is performed.

FIG. 21 illustrates a screen example displayed on the display 15 when the message 2 is transmitted after the link destination change process is performed on the message 2 in the screen example of FIG. 16. Referring to FIG. 21, the message from the link destination of the message 2 is changed from the message 1 to the message 3 in the edit dialog box 25.

The message 2 being drafted is associated with ">(message 1)" as in FIG. 16, but the message 2 that is transmitted is associated with ">(message 3)" as in FIG. 21. Also, "message 3" is set in the link information that is attached to the transmission message as the message 2.

The results of the edit operation performed by the user may be used in the third exemplary embodiment to learn the message distance that is used in determining whether the insertion message is a particular received message.

If the user deletes the association between the transmission message and the message from the link destination, the transmission message may be considered to have no relationship with the message from the link destination. An estimate model of the message distance is corrected such that the message distance between the transmission message and the message from the link destination is increased if the association therebetween is deleted. The estimation accuracy of the message distance is increased in comparison with the case in which the estimate model of the message distance is fixed.

More specifically, if a neural network is used in the estimate model of the message distance, the contents of the transmission message and the message from the link destination with the association thereof deleted are used as a learning sample, and information indicating no relationship is input as a teaching signal. The learning operation of the neural network is performed such that a longer message distance is output for a combination of messages having the same contents than before learning.

The learning sample of the message and the teaching signal may be transmitted to the management apparatus 11. The management apparatus 11 may centrally perform the learning operation on message distances, and the information processing apparatus 12 may receive the message distance calculated by the management apparatus 11. Since each information processing apparatus 12 transmits the learning sample and the teaching signal to the management apparatus 11, the management apparatus 11 corrects the estimate model of the message distance using more learning samples than the number of learning samples obtained by each information processing apparatus 12. The estimation accuracy of the message distance is higher than when the estimate model of the message distance is corrected on each information processing apparatus 12.

If the user modifies the association between the transmission message and the message from the link destination, the degree of relationship between the transmission message and the message from the link destination is considered to be lower prior to the modification and the degree of relationship between the transmission message and the message from the link destination is considered to be higher subsequent to the modification. The estimate model of the message distance may be corrected such that the message distance between the transmission message and the message from the link destination is longer prior to the modification than the present time and the message distance between the transmission message and the message from the link destination is shorter subsequent to the modification than the present time. The estimation accuracy of the message distance is higher than when the estimate model of the message distance is fixed.

Not only the estimate model of the message distance but also the reference distance may be corrected in accordance with the results of the edit operation performed by the user. For example, the reference distance may be corrected such that the reference distance becomes shorter than at the present time for a combination of the transmission message and the message from the link destination with the association therebetween deleted.

In accordance with the exemplary embodiments, the message transmission process, the message reception process, the link destination deletion process, and the link destination change process are implemented using software. The processes identical to those illustrated in the flowcharts of FIG. 5, FIG. 7, FIG. 8, FIG. 10, FIG. 14, FIG. 18, and FIG. 20 may be implemented using hardware, such as an application specific integrated circuit (ASIC). In such a case, a higher processing speed may be achieved than when each process is implemented using software.

In accordance with the exemplary embodiments, the information processing program is installed on the ROM 52. The present invention is not limited to this manner. The information processing program of the exemplary embodiments of the present invention may be supplied in a recorded form on a computer-readable recording medium. The information processing program of the exemplary embodiments of the present invention may be supplied in a recorded form on an optical disk, such as a compact disk ROM (CD-ROM), or a digital versatile disk ROM (DVD-ROM). The information processing program of the exemplary embodiments of the present invention may be supplied in a recorded form on a semiconductor memory, such as a universal serial bus (USB) memory or a flash memory. The information processing apparatus 12 may acquire the information processing program of the exemplary embodiments of the present invention via the communication network 13 from another external apparatus connected to the management apparatus 11 and the communication network 13.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
  a display configured to display messages received from a plurality of other information processing apparatuses, and transmission messages from the information processing apparatus, in a display region in a time sequence;
  a receiving unit configured to receive a transmission message responsive to a received message displayed on the display, and a transmission instruction of the transmission message; and
  a controller configured to:
    if a second received message different from a first received message from a link destination to which the transmission message is directed is displayed in the display region before the receiving unit receives the transmission instruction of the transmission message, control the display such that the transmission message indicating an association with the first received message is displayed on the display region;
    if a plurality of transmission messages are transmitted within a predetermined period of time, determine that the plurality of transmission messages satisfy a first predetermined condition that they are regarded as a group; and
    if the first predetermined condition is satisfied, determine that each of the plurality of transmission messages included in the group is a response to the first received message, and control the display such that the first received message is displayed in association with the transmission messages regarded as the group on the display region.

2. The information processing apparatus according to claim 1, wherein if the receiving unit has received the transmission instruction of the transmission message, the controller is configured to associate, as the first received message, a latest received message out of the received messages displayed on the display region with the transmission message.

3. The information processing apparatus according to claim 1, wherein the receiving unit is configured to receive a select command to select a transmission message, and
wherein the controller is configured to determine that each of the transmission messages selected in response to the select command received by the receiving unit satisfies the first predetermined condition.

4. The information processing apparatus according to claim 1, wherein if a second predetermined condition that the second received message does not affect a flow of a conversation is satisfied, the controller is configured to control the display such that a transmission message with the association thereof with the first received message not displayed is displayed in the display region.

5. The information processing apparatus according to claim 2, wherein if a second predetermined condition that the second received message does not affect a flow of a conversation is satisfied, the controller is configured to control the display such that a transmission message with the association thereof with the first received message not displayed is displayed in the display region.

6. The information processing apparatus according to claim 3, wherein if a second predetermined condition that the second received message does not affect a flow of a conversation is satisfied, the controller is configured to control the display such that a transmission message with the association thereof with the first received message not displayed is displayed in the display region.

7. The information processing apparatus according to claim 1, wherein the receiving unit is configured to receive an edit command to edit a received message associated with a transmission message, and
wherein the controller is configured to modify the first received message associated with the transmission message in response to the edit command received by the receiving unit.

8. The information processing apparatus according to claim 2, wherein the receiving unit is configured to receive an edit command to edit a received message associated with a transmission message, and
wherein the controller is configured to modify the first received message associated with the transmission message in response to the edit command received by the receiving unit.

9. The information processing apparatus according to claim 3, wherein the receiving unit is configured to receive an edit command to edit a received message associated with a transmission message, and
wherein the controller is configured to modify the first received message associated with the transmission message in response to the edit command received by the receiving unit.

10. The information processing apparatus according to claim 7, wherein if the receiving unit receives a command to delete the association of the transmission message with the first received message, the controller is configured to control the display such that the association of the transmission message with the first received message is not displayed in the transmission message with a deletion of the association thereof with the first received message being requested.

11. The information processing apparatus according to claim 8, wherein if the receiving unit receives a command to delete the association of the transmission message with the first received message, the controller is configured to control the display such that the association of the transmission message with the first received message is not displayed in the transmission message with a deletion of the association thereof with the first received message being requested.

12. The information processing apparatus according to claim 7, wherein if the receiving unit receives a command to modify the first received message with which the transmission message is associated, the controller is configured to control the display such that the association with the received message specified by the command to modify is displayed in the transmission message with a modification of the association thereof being requested.

13. A non-transitory computer readable medium storing a program causing a computer to execute a process for processing information, the process comprising:
displaying messages received from a plurality of other information processing apparatuses, and transmission messages from an information processing apparatus, in a display region in a time sequence;
receiving a transmission message responsive to a received message displayed on the display, and a transmission instruction of the transmission message;
if a second received message different from a first received message from a link destination to which the transmission message is directed is displayed in the display region before the transmission instruction of the transmission message is received, controlling the display such that the transmission message indicating an association with the first received message is displayed on the display region;
if a plurality of transmission messages are transmitted within a predetermined period of time, determining that the plurality of transmission messages satisfy a first predetermined condition that they are regarded as a group; and
if the first predetermined condition is satisfied, determining that each of the plurality of transmission messages included in the group is a response to the first received message, and controlling the display such that the first received message is displayed in association with the transmission messages regarded as the group on the display region.

14. An information processing system comprising:
a plurality of information processing apparatuses that each are the information processing apparatus according to claim 1; and
a management apparatus configured to transmit a message received from one of the plurality of information processing apparatuses to each of the plurality of information processing apparatuses.

15. An information processing apparatus comprising:
a display configured to display messages received from a plurality of other information processing apparatuses, and transmission messages from the information processing apparatus, in a display region in a time sequence;
a receiving unit configured to receive a transmission message responsive to a received message displayed on the display, a select command to select the transmission message, and a transmission instruction of the transmission message; and
a controller configured to:
if a second received message different from a first received message from a link destination to which the transmission message is directed is displayed in the display region before the receiving unit receives the transmission instruction of the transmission message, control the display such that an association between the first received message and the transmission message is displayed on the display region, the association being represented by displaying the first received message if the transmission message is selected;

if a plurality of transmission messages are transmitted within a predetermined period of time, determine that the plurality of transmission messages satisfy a first predetermined condition that they are regarded as a group; and if the first predetermined condition is satisfied, determining that each of the plurality of transmission messages included in the group is a response to the first received message, and control the display such that the first received message is displayed in association with the transmission messages regarded as the group on the display region.

\* \* \* \* \*